United States Patent

[11] 3,607,166

[72] Inventors: Frederick A. Loughridge, Manchester; Richard J. Ziebell, Ipswich, both of, Mass.
[21] Appl. No.: 749,554
[22] Filed: June 26, 1968
[45] Patented: Sept. 21, 1971
[73] Assignee: Sylvania Electric Products Inc.
Continuation of application Ser. No. 726,889, May 6, 1968, now abandoned.

[54] MANUFACTURE OF STRIATION-FREE QUARTZ TUBING
9 Claims, 2 Drawing Figs.

[52] U.S. Cl. ........................................... 65/18, 65/21, 65/32, 65/144, 65/109
[51] Int. Cl. ........................................... C03b23/20, C03b 19/06, C03b 3/00
[50] Field of Search ........................................ 65/32, 335, 13, 18, 21, 144, 109

[56] References Cited
UNITED STATES PATENTS

| | | | |
|---|---|---|---|
| 1,229,324 | 6/1917 | Rosenblum | 65/32 |
| 1,537,036 | 5/1925 | Miller | 65/18 X |
| 2,114,545 | 4/1938 | Slayter | 65/335 X |
| 2,371,213 | 3/1945 | Batchell | 65/335 |
| 2,785,058 | 3/1957 | Buehler | 65/DIG. 8 |
| 2,930,098 | 3/1960 | Emeis | 65/18 |
| 2,963,824 | 12/1960 | Pinotti | 65/21 |
| 3,109,045 | 10/1963 | Silverman | 65/335 X |
| 3,134,659 | 5/1964 | Labino | 65/335 X |
| 3,212,871 | 10/1965 | Vatterrudt | 65/32 X |
| 3,248,191 | 4/1966 | Canfield | 65/335 X |
| 3,261,676 | 7/1966 | Morelock | 65/32 X |
| 3,320,045 | 5/1967 | Weiss et al. | 65/32 X |

Primary Examiner—Frank W. Miga
Attorneys—Norman J. O'Malley and Owen J. Meegan

ABSTRACT: Striation-free, refractory-type glass tubing can be manufactured by placing particulate, crystalline, refractory materials in a tube of refractory glass having a sealed end. The tube is evacuated to withdraw gases and the vacuum is maintained. The sealed end of the tube is heated to its softening point and the particulate materials contained therein will melt, thereby converting these materials into a vitreous condition. Softened pieces are then broken off and substantially gas-free bodies of vitreous, refractory glasses having substantially no reentrant portions are formed. The majority of the surfaces are smooth and rounded. These bodies are then fed into a melter of conventional design at atmospheric pressure and substantially striation-free, refractory-type tubing is drawn.

PATENTED SEP 21 1971 3,607,166

INVENTORS
FREDERICK A. LOUGHRIDGE
RICHARD J. ZIEBELL
BY Owen J. Meegan
ATTORNEY

MANUFACTURE OF STRIATION-FREE QUARTZ TUBING

CROSS REFERENCE TO RELATED APPLICATIONS

This application is a continuation of our copending application, Ser. No. 726,889, filed May 6, 1968 now abandoned.

BACKGROUND OF THE INVENTION

1. Field Of The Invention

This invention relates to the manufacture of refractory-type tubing and particularly to the manufacture of a striation-free material. Refractory glasses melt between about 1,500 and 2,200° C. and are silica-based materials such can contain metal oxides of low vapor pressure, such as aluminum oxide, calcium oxide and magnesium oxide. The principal refractory-type glass is fused quartz which is formed of pure silica or silica doped with heavy metal compounds such as vanadium, cerium, titanium, iron, copper and molybdenum.

2. Description Of The Prior Art

Refractory glass tubing has been manufactured by a variety of methods. Moreover, many techniques have been devised for the elimination of striations from the finished product. Inclusion of such striae is quite undesirable for many applications of the tubing, particularly in lamp manufacture, since the appearance is not wholly desirable and light transmission is reduced somewhat.

Striations in the tubing are formed by the inclusion of gas bubbles in the vitreous melt from which the tubing is drawn. The melt is so viscous that even prolonged heating at elevated temperatures will not drive them out. Such gas becomes entrapped when particulate or crystalline refractory materials are dropped on top of the molten mass in the melter. Craggy portions of the crystals rest on top of the melt-forming pockets and preventing the gas in the atmosphere from rising from the interface at the surface of the melt. As the crystals melt, the gas becomes entrapped in these pockets and goes into the melt as bubbles which cannot escape because of the viscosity of the molten glass. Moreover, entrapped gases are also naturally contained within the crystals themselves so that unless they are removed before being fed into the melter, they will enter the melt as bubbles. Subsequent drawing of the melt into tubing elongates the bubbles into striations.

As quartz crystals are heated, they progress through a series of crystalline inversions. Below 573° C., α-quartz occurs; between 575 and 870° C., β-quartz is formed. Between 870 and 1,470° C., tridymite forms, β-cristobalite forms between 1,470 and 1,625° C. while above 1,710° C., the noncrystalline, fused silica forms. Each of these inversions involves reorientation of the crystal structure and differences in thermal expansion rates of the various crystal species produce cracking of the crystals. They shatter and break apart into smaller crystals, thus making their use in a melter even more undesirable. Shattering disturbs the top of the melt and introduces bubbles by creating voids or pockets for gas entrapment.

Entrapment of gas in melted quartz has previously been known to be a problem. For example, the U.S. Pat. No. to Miller, number 1,537,036 discloses a method of manufacturing clear quartz ingots by melting the material under vacuum and then subjecting it to pressure to eliminate the bubbles. Such processes require vacuum techniques, are intermittent and do not lend themselves to continuous production. Moreover, expensive crucibles have to be discarded after each ingot is formed.

The patent to Morelock, number 3,261,676 discloses an approach in which a quartz tube is filled with sand and the tube and sand are softened together. While soft and while the tube is under vacuum, the melt is drawn to form a quartz tube. The process is intermittent in concept.

SUMMARY OF THE INVENTION

According to the present invention, a tube of vitreous refractory glass, especially quartz, having a closed end is filled with a granular refractory material, such as quartz sand. The cost of the sand is quite low compared to the high-grade crystal and substantial cost savings can be realized through its use. When filled, the tubing is attached to a vacuum line and evacuated. The end of the tubing is heated to softening, while the vacuum is maintained. During the heating, the quartz sand melts and is changed into a vitreous form which is free of entrapped gas. When the sand and tubing are soft and vitreous, smaller bodies are formed therefrom, preferably by shearing them off from the softened tube. Since they are still soft and plastic, as they drop after being cut from the tubing, they form into smooth and rounded bodies of substantially gas-free glass. At the spear point, a sharp edge may occur, but does not adversely effect the use of such bodies in the melter.

The bodies (either hot or cold) are subsequently fed into a melter of conventional design in a continuous flow, such as described in the copending application of Loughridge et al., Ser. No. 572,110, filed Aug. 12, 1966 and assigned to the same assignee as this application. There they are again heated to a molten mass and tubing is drawn. The melter can be maintained at atmospheric pressure in a protective gas atmosphere and special vacuum systems need not be used. The tubing which is drawn is free of striations due to gas bubbles because the vitreous feed is free of gas. Moreover, no substantial quantities of the protective gas are entrapped between the bodies which are used for the feed as they rest on top of the molten mass in the melter. Such entrapment is prevented because the protective gas can flow around the smooth and rounded surfaces of the quartz bodies which are free of pockets and fissures which could produce entrapment. In this way, the gas easily escapes from the interface between the melt and the bodies. Wall thicknesses of the tubing and the diameter are controlled by modifying the temperature of the melter, the rate of draw and the size of the orifice through which the tubing is drawn.

DESCRIPTION OF THE PREFERRED EMBODIMENTS

Figure 1:
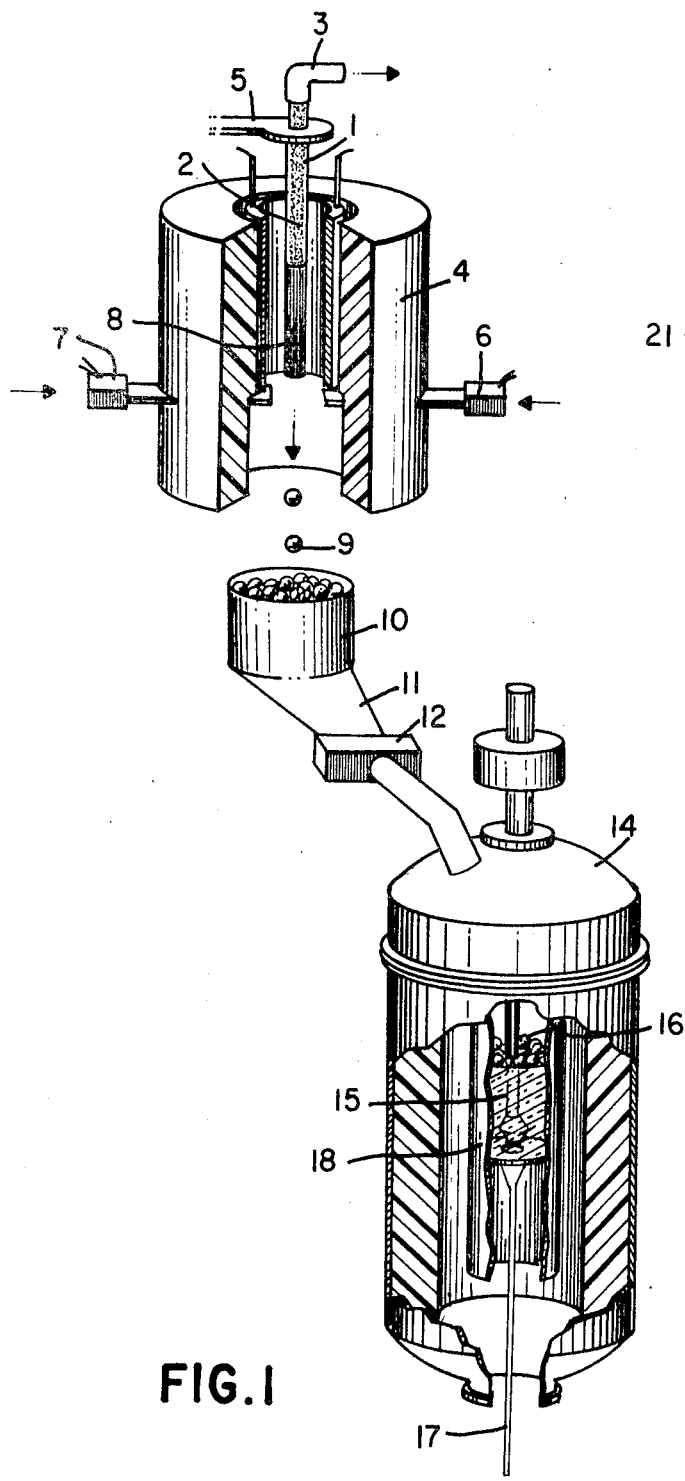
FIG. 1 is a diagrammatic illustration of equipment which can be used to form the smooth-shaped bodies and subsequently draw them into tubing.

According to the present invention, a tube of quartz 1 is substantially filled with quarts sand 2. The top of the tube 1 is substantially filled with quartz sand 2. The top of the tube 1 is fitted to a vacuum line 3 through which gases contained in the tube 1 are removed. Support for the tube 1 in furnace 4 is provided by holder 5. Furnace 4 can be heated electrically or by gas and is of a conventional design, except for shears 6 and 7 which will be described later. Tube 1 is gradually lowered in the furnace and heated so that the lower end 8 and the sand contained therein is softened and converted into a vitreous mass.

When soft, a segment of the tube 1 is indexed between shears 6 and 7 which are actuated to snip off a portion. Since this portion is soft, it forms into a vitreous body 9 in which most of the surface is smooth. These surfaces are created by surface tension of the glass in the molten state. The shape into which the body 9 forms is not too critical, so long as most of the surface is smooth and contains no re-entrant pockets. For example, spherical shapes can be used for the present process, however, generally cylindrical bodies are applicable also. The ends of the cylindrical bodies can be pinched and even somewhat rough from the shearing. The diameter of a cylinder need not be uniform from one end to another, as would be the case with a teardrop shape. Because all of the gases have been removed from the tube, the bodies are substantially gas free, although some tiny gas pockets may be present.

These bodies 9 are then deposited in a feed hopper 10. A continuous feed is shown in the figure and the bodies drop from the shears 6 and 7 into the hopper; however, this approach is not essential. For example, the bodies 9 can be made, stored and then fed into the hopper 10 when needed.

For the hopper 10, the bodies fall through a chute 11, through an interlock valve 12 (which prevents oxygen from entering the melter) and finally into the melter 14. The structure of the melter is described in the above-mentioned application of Loughridge.

The melter operates with a protective atmosphere of forming gas ($90\%N_2$—$10\%H^2$) so that the internal parts do not oxidize due to the extremely high temperatures involved, generally in the region of 2,000° C. Sufficient gas pressure is used so that air will not seep into the melter. The bodies are softened by the furnace and form an extremely viscous melt 15 held by container 18. Floating on top of the melt 15 are the bodies 16 which gradually softened and merge into the melt 15. As is shown in greater detail in FIG. 2, because of substantially smooth and rounded sides of the bodies, gases which are present over the melt 15 and between the bodies 16 are free to rise and are not entrapped as bubbles. Hence, the melt will be substantially free from bubbles and thus striations will not appear when the tubing 17 is drawn.

Figure 2:
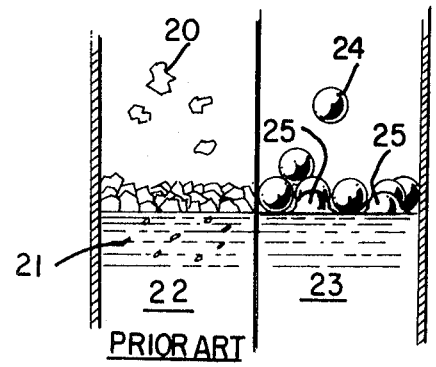
FIG. 2 is an illustration of the melter and the interface between the molten quartz and the feed material. For illustrative purposes, one-half of the melter is shown with a feed of crystalline quarts, as in the prior art, while the other half shows the position of vitreous bodies upon the melt.

Referring now to FIG. 2, the container and the interface between the melt and the feed is shown in greater detail. When crystals 20 are fed into the container, gas bubbles 21 can become entrapped in the melt 22 due to the craggy surfaces, pockets and fissures which are involved. The gases cannot freely vent from the melt and gradually they become entrapped due to pockets which are present. When the bodies 24 of the present invention are used however, the gases cannot become entrapped because they are free to move around the smooth surfaces and vent to the atmosphere to the melter. Body 25, for example, is partially merged into the melt with the lower portion (unshown) already an integral part. Any gases can easily flow between the sides of body 25 and the other unmelted or partially melted bodies.

As mentioned previously, when crystals are used, they go through a series of crystalline inversions. This produces cracks and fissures which can entrap more bubbles. Through the use of vitreous bodies, these inversion stages do not occur. The bodies are already in the vitreous low expansion form and undergo no further inversions.

The following Example is set forth to illustrate the invention, but is not intended to be limitative upon the claims.

A quartz tube, 22 mm. in diameter and 48 inches in length, having a sealed end, is filled with fine quartz sand particles having a size of −20 to +150 mesh. A vacuum line is attached to the open end of the filled tube which is then vertically disposed in a furnace. The filled tube is then heated in the furnace until the quartz particles fuse and form a vitreous mass. Generally, the temperature is about 1,950° C. During the softening, the vacuum is maintained so that gases which are present are withdrawn.

A body of about three-fourths inch in length is sheered from the softened tube and allowed to drop into a container. With the shaping action of the shears and due to free fall, the sides of the body can become smooth and rounded. At the point where the shears cut the softened quartz, a slightly rough edge can occur, but such minor roughness does not prevent the free flow of gas around the bodies in the melter.

The bodies are then fed into a melter where they float on top of the viscous, vitreous melt. A positive pressure of forming gas ($90\%N_2$—$10\%H_2$) is maintained within the furnace to prevent the entrance of air which would oxidize the highly heated components. The forming gas flows out through the exit part of the furnace through which the quartz is drawn. The bodies soften and merge with the molten mass in such a way that bubble entrapment of the gases in the furnace is substantially prevented.

Quartz tubing is then continuously drawn from the bottom of the melter. The tubing is essentially free from mechanically entrapped gases and hence substantially free of striations.

CONCLUSION

It is apparent that modifications and changes may be made within the spirit of the instant invention, but it is our intention only to be limited by the scope of the appended claims.

As our invention, we claim:

1. In the manufacture of quartz glass articles, the steps which comprise: placing granular quartz crystals within a quartz tube; evacuating gases from said tube and heating the end to softening, thereby converting the crystals to a vitreous state; removing substantially smooth and rounded vitreous bodies from the softened end of said tube; feeding said vitreous bodies into a melter and heating so that they are incorporated into the melt; removing quartz glass articles from said melt, said articles being substantially free of entrapped gases.

2. The process according to claim 1 wherein the bodies are generally spherical shape.

3. In the manufacture of quartz glass tubing, the steps which comprise: sealing one end of a quartz tube; filling the tube with said; connecting the open end of the tube to a vacuum line; placing the tube in a furnace; evacuating the tube; heating a portion at the closed end of the tube to its softening point and converting the sand therein to a vitreous state; severing the softened portion so as to form a vitreous quartz body having substantially smooth and rounded sides; feeding said body into a quartz melter and heating so as to incorporate said body into the melt; and drawing quartz glass tubing from said melt, said tubing being substantially free of striations caused by entrapped gases.

4. The process according to claim 3 wherein the sand has a particle size between about −20 to +150 mesh.

5. The process according to claim 3 wherein there is a gas atmosphere in said melter.

6. In the manufacture of quartz glass tubing, the steps which comprise: sealing one end of a quartz tube; filling the tube with sand; connecting the open end of the tube to a vacuum line; placing the tube in a furnace; evacuating the tube; heating a portion at the closed end of the tube to its softening point and converting the sand therein to a vitreous state; severing the softened portion; permitting the severed portion to fall free so as to form a vitreous quartz body having substantially smooth and rounded sides; feeding said body into a quartz melter and heating so as to incorporate said body into the melt; and drawing quartz glass tubing from said melt, said tubing being substantially free of striations caused by entrapped gases.

7. The process according to claim 6 wherein the sand has a particle size between about −20 to +150 mesh.

8. The process according to claim 7 wherein the bodies are generally spherical shape.

9. The process according to claim 6 wherein there is a gas atmosphere in said melter.